(12) United States Patent
Takeshita et al.

(10) Patent No.: US 7,177,468 B2
(45) Date of Patent: Feb. 13, 2007

(54) IMAGE PROCESSING SYSTEM, IMAGING DEVICE, AND PARAMETER-DETERMINING PROGRAM

(75) Inventors: Tetsuya Takeshita, Yokohama (JP); Yutaka Tsuda, Yokohama (JP)

(73) Assignee: Nikon Corporation, Tokyo (JP)

( * ) Notice: Subject to any disclaimer, the term of this patent is extended or adjusted under 35 U.S.C. 154(b) by 649 days.

(21) Appl. No.: 10/377,633

(22) Filed: Mar. 4, 2003

(65) Prior Publication Data

US 2003/0185440 A1    Oct. 2, 2003

(30) Foreign Application Priority Data

Mar. 28, 2002    (JP)    ............................. 2002-092051

(51) Int. Cl.
*G06K 9/00*    (2006.01)
(52) U.S. Cl. ...................... 382/167; 382/162; 382/274; 382/254; 358/1.9; 358/1.15; 358/518
(58) Field of Classification Search ................ 382/118, 382/232, 233, 162, 165, 166, 167, 254, 274; 358/1.15, 1.9, 518–523
See application file for complete search history.

(56) References Cited

U.S. PATENT DOCUMENTS

| | | | |
|---|---|---|---|
| 5,926,219 A | | 7/1999 | Shimizu et al. |
| 6,014,457 A | | 1/2000 | Kubo et al. |
| 2003/0012436 A1* | | 1/2003 | Lyford et al. ................ 382/167 |
| 2003/0103234 A1* | | 6/2003 | Takabayashi et al. ....... 358/1.15 |
| 2004/0052424 A1* | | 3/2004 | Kokemohr ................... 382/254 |
| 2004/0075743 A1* | | 4/2004 | Chatani et al. ........... 348/207.1 |
| 2005/0264832 A1* | | 12/2005 | Baum et al. ................. 358/1.2 |

FOREIGN PATENT DOCUMENTS

| | | |
|---|---|---|
| EP | 11 355 587 | 12/1999 |
| JP | A 2001-057650 | 2/2001 |
| JP | A 2001-238222 | 8/2001 |

OTHER PUBLICATIONS

U.S. Appl. No. 09/637,606—Filed Aug. 15, 2000.

* cited by examiner

*Primary Examiner*—Jingge Wu
*Assistant Examiner*—Ali Bayat
(74) *Attorney, Agent, or Firm*—Oliff & Berridge, PLC

(57) ABSTRACT

An image processing system can obtain images exhibiting colors desired by a user, while minimizing his/her efforts required for edit operations. The image processing system includes an imaging device and an information-processing device. The information-processing device includes: an input unit inputting, from the exterior, information indicative of a type of color transformation processing desired by the user; a parameter-creating unit that refers to the input information to create at least one parameter necessary for providing the color transformation processing to image data; and a transmitting unit transmitting information of the created parameter to the exterior. The imaging device includes: a receiving unit receiving the information of the parameter from the exterior; a storage unit storing the received information of the parameter; and a setting unit that refers to the information stored in the storage unit to perform a setting necessary for the color transformation processing using the parameter.

14 Claims, 8 Drawing Sheets

| IDENTIFICATION INFORMATION | COLOR TRANSFORMATION MATRIX |
|---|---|
| FLUORESCENT LIGHT | M1 |
| SUN LIGHT | M2 |
| INCANDESCENT LIGHT | M3 |
| ⋮ | ⋮ |

(a)

(b)

(c)

IMAGE PROCESSING SYSTEM, IMAGING DEVICE, AND PARAMETER-DETERMINING PROGRAM

BACKGROUND OF THE INVENTION

1. Field of the Invention

The present invention relates to an image processing system constituted by an imaging device and an information-processing device. The present invention also relates to the imaging device. The present invention further relates to a parameter-determining program for determining parameters to be used in the imaging device.

2. Description of the Related Art

Images obtained by an imaging device, such as an electronic camera or the like, may be brought into a computer.

If a photo-retouching software has been previously installed in the computer, the user can utilize the software to edit each image so that it exhibits his/her desired colors.

In such a case, a purpose of editing the colors of images may be decided beforehand. For example, one purpose may be to make the blue color of the sky more vibrant, while another purpose may be to make the color of the human skin closer to red.

In this way, if a purpose is already decided in advance, it would be very troublesome for the user to perform edit operations for each image.

SUMMARY OF THE INVENTION

An object of the present invention is to provide an image processing system capable of obtaining images exhibiting colors desired by the user, while minimizing the user's efforts required for edit operations.

Another object of the present invention is to provide an imaging device used in the image processing system.

Still another object of the present invention is to provide a parameter-determining program for determining parameters to be used in the imaging device.

To achieve the above objects, the image processing system of the present invention includes: an imaging device for imaging a subject to obtain image data; and an information-processing device for determining at least one parameter to be used for a color transformation processing in the imaging device. The information-processing device includes: an input unit for inputting, from the exterior, information indicative of a type of color transformation processing desired by a user; a parameter-creating unit that refers to the input information to create at least one parameter necessary for providing the color transformation processing to the image data; and a transmitting unit for transmitting the information of the created parameter to the exterior. The imaging device includes: a receiving unit for receiving the information of the parameter from the exterior; a storage unit for storing the received information of the parameter; and a setting unit that refers to the information stored in the storage unit to perform a setting necessary for the color transformation processing using the parameter.

According to the structure described above, the type of color transformation processing desired by the user is reflected in the color transformation processing in the imaging device. Additionally, since the information indicative of the type of color transformation processing desired by the user is stored in the storage unit, the imaging device can repeatedly implement such a color transformation processing.

Therefore, when a purpose of editing the colors of images is already decided in advance, images exhibiting colors desired by the user can be obtained with the minimum efforts of the user which are necessary for the edit operations.

Preferably, in the present image processing system, the color transformation processing is performed using a color transformation matrix, and the foregoing parameter is each element of the color transformation matrix. Using such color transformation matrixes allows image data to be subjected to relatively many types of color transformation processings with relatively small capacities of information used.

Preferably, in the present image processing system, the input unit of the information-processing device inputs the information indicative of the desired type of color transformation processing, by showing the user an image obtained by an imaging sensor having the same characteristics as an imaging sensor in the imaging device, and by allowing the user to edit the obtained image. The user can input the information indicative of his/her desired type of color transformation processing to the information-processing device, only by performing edit operations of the image.

Preferably, in the present image processing system, the input unit of the information-processing device inputs, as the information indicative of the type of color transformation processing, an attention color attended by the user and a desired color desired by the user with respect to the attention color. The user can input the information indicative of his/her desired type of color transformation processing to the information-processing device, only by inputting the attention and desired colors.

Preferably, in the present image processing system, the input unit of the information-processing device inputs, as the information indicative of the type of color transformation processing, at least one of an angular variation level of hue desired by the user and a variation level of chroma desired by the user. The user can input the information indicative of his/her desired type of color transformation processing to the information-processing device, only by inputting at least one of the angular variation level of hue and the variation level of chroma.

Preferably, in the present image processing system, the setting unit of the imaging device performs the setting in accordance with the information of the parameter stored in the storage unit and the type of a subject to be imaged. In this way, not only the user's desired type of color transformation processing but also the type of the subject can be reflected in the color transformation processing.

Preferably, in the present image processing system, the storage unit of the imaging device can store a plurality of types of information on the parameter. Therefore, the imaging device can also satisfy the tastes of a plurality of users.

Preferably, in the present image processing system, the setting unit of the imaging device selectively uses one of the plurality of types of information on the parameter stored in the storage unit. Therefore, the imaging device can also satisfy the tastes of a plurality of users. The imaging device of the present invention includes: a receiving unit for receiving, from the exterior, information of at least one parameter necessary for a color transformation processing of image data; a storage unit for storing the received information of the parameter; and a setting unit that refers to the information of the parameter stored in the storage unit to perform a setting necessary for the color transformation processing using the parameter. This imaging device is applicable to the image processing system of the present invention.

Preferably, in the present imaging device, the color transformation processing is performed using a color transformation matrix, and the parameter is each element of the color transformation matrix. Using such color transformation matrixes allows image data to be subjected to relatively many types of color transformation processings with relatively small capacities of information used.

Preferably, in the present imaging device, the setting unit performs the setting in accordance with the information of the parameter stored in the storage unit and the type of a subject to be imaged. In this way, not only the user's desired type of color transformation processing but also the type of the subject can be reflected in the color transformation processing.

Preferably, in the present imaging device, the storage unit can store a plurality of types of information on the parameter. Therefore, the imaging device can also satisfy the tastes of a plurality of users.

Preferably, in the present imaging device, the setting unit selectively uses one of the plurality of types of information on the parameter stored in the storage unit. Therefore, the imaging device can also satisfy the tastes of a plurality of users.

The parameter-determining program of the present invention determines at least one parameter to be used for a color transformation processing in an imaging device that images a subject to obtain image data. This program includes: an input step of inputting, from the exterior, information indicative of a type of color transformation processing desired by a user; a parameter-creating step of referring to the input information to create at least one parameter necessary for providing the color transformation processing to the image data; and a transmitting step of transmitting the information of the created parameter to the exterior.

This parameter-determining program allows a computer to be operated as the image processing device of image processing system of the present invention.

Preferably, in the present parameter-determining program, the color transformation processing is performed using a color transformation matrix, and the parameter is each element of the color transformation matrix. Using such color transformation matrixes allows image data to be subjected to relatively many types of color transformation processings with relatively small capacities of information used.

Preferably, according to the present parameter-determining program, in the input step, the information indicative of the desired type of color transformation processing is input, by showing the user an image obtained by an imaging sensor having the same characteristics as an imaging sensor in the imaging device, and by allowing the user to edit the obtained image. The user can input the information indicative of his/her desired type of color transformation processing to the information-processing device, only by performing edit operations of the image.

Preferably, according to the present parameter-determining program, in the input step, an attention color attended by the user and a desired color desired by the user with respect to the attention color is input as the information indicative of the type of color transformation processing. The user can input the information indicative of his/her desired type of color transformation processing to the information-processing device, only by inputting the attention and desired colors.

Preferably, according to the present parameter-determining program, in the input step, at least one of an angular variation level of hue desired by the user and a variation level of chroma desired by the user is input as the information indicative of the type of color transformation processing. The user can input the information indicative of his/her desired type of color transformation processing to the information-processing device, only by inputting at least one of the angular variation level of hue and the variation level of chroma.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 7 is a diagram explaining matrix information written into an EEPROM in an electronic camera of a third embodiment of the present invention.

DESCRIPTION OF THE PREFERRED EMBODIMENTS

Embodiments of the present invention will be described below with reference to the drawings.

<First Embodiment>

Figure 1:
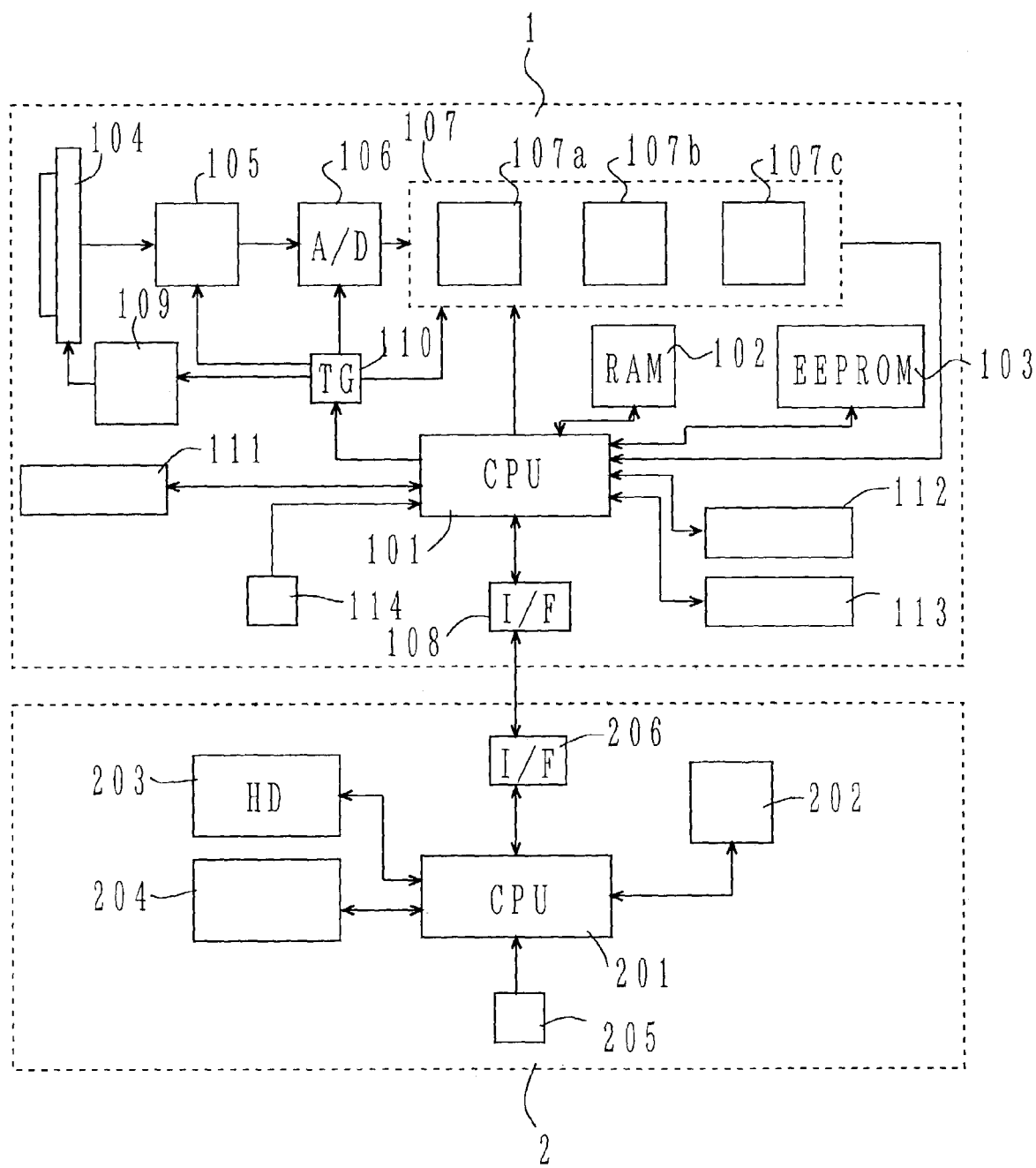
FIG. 1 is a block diagram showing the structure of an image processing system according to a first embodiment of the present invention.

A first embodiment of the present invention will be described with reference to FIGS. 1, 2, 3, and 4. FIG. 1 is a block diagram showing the structure of an image processing system according to the present embodiment. The image processing system is constituted by an electronic camera 1 and a computer 2, which are allowed to communicate with each other via interface circuits (I/Fs) 108 and 206.

The electronic camera 1 includes, in addition to the interface circuit 108, a CPU 101, a RAM 102, a ROM 103, an imaging sensor 104, an analog operating circuit 105, an A/D converter 106, an image processing circuit 107 (which includes ASICs and so on), an imaging sensor driver 109, a timing generator (TG) 110, a memory card 111, a switch 114 and so on. (Reference numerals 112 and 113 also shown in FIG. 1 designate a lens controller and a focusing circuit, respectively.)

The ROM 103 is a rewritable ROM, such as EEPROM (hereinafter referred to as EEPROM 103).

The image processing circuit 107 includes a white balance processing circuit 107a, a color transformation circuit 107b, a gray-scale transformation circuit 107c, an encoding circuit (not shown) and so on.

When the user operates the switch 114 to enter an instruction of focus adjustment into the electronic camera 1, the CPU 101 drives the focusing circuit 113, and then drives the lens controller 112 based on a detection result from the focusing circuit 113.

The lens controller 112 drives an imaging lens (not shown) to form an image of a subject on the imaging sensor 104.

Furthermore, when the user operates the switch 114 to enter an instruction of image pickup into the electronic camera 1, the CPU 101 causes the imaging sensor driver 109 to drive the imaging sensor 104, thereby performing the image pickup.

Image data obtained by the imaging sensor 104 are inputted to the image processing circuit 107 via the analog operating circuit 105 and the A/D converter 106.

The timings at which the analog operating circuit 105, A/D converter 106, imaging sensor driver 109, and image processing circuit 107 and so on operate are controlled by the TG 110.

The above image data obtained are subjected to white balance processing, color transformation processing, and gray-scale transformation processing in the white balance processing circuit 107a, color transformation circuit 107b, and gray-scale transformation circuit 107c, respectively.

Then, the image data are encoded as required and stored in the memory card 111. It should be noted, however, that the image data may be transmitted to the exterior via the interface circuit 108 without being stored in the memory card 111.

The EEPROM 103 in the present embodiment has stored therein at least the information of color transformation matrix M (matrix information) used in the color transformation circuit 107b.

The color transformation matrix M is a matrix of a predetermined order and is defined by a predetermined number of parameters. Assume that the color transformation matrix M herein is a three by three matrix and is defined by nine parameters m11, m12, m13, m21, m22, m23, m31, m32, and m33.

When the image data are subjected to the color transformation processing, the CPU 101 refers to the matrix information stored in the EEPROM 103, and sets, in the color transformation circuit 107b, the color transformation matrix M indicated by the matrix information.

The color transformation circuit 107b multiplies each of the input signals by the set color transformation matrix M, thereby performing the color transformation processing.

Next, the computer 2 includes, in addition to the interface circuit 206, a CPU 201, a memory 202, a storage unit 203 (such as a hard disk drive or the like), an input unit 205 (such as a keyboard, a mouse or the like), a display unit 204 and so on. It should be noted that the storage unit 203 and input unit 205 may be external to the computer 2.

In the present embodiment, a parameter-determining program (see FIG. 2) for the electronic camera 1 is installed in the computer 2 in advance.

According to the parameter-determining program, the CPU 201 causes each part of the computer 2 to operate in the following manners. (It should be noted that the installation of the parameter-determining program may be performed via a recording medium or a communication network such as the Internet or the like.)

This parameter-determining program includes a processing step that allows the user to edit images.

As man-machine interfaces to be utilized in the step, the display unit 204 and input unit 205 are used.

Assume that the computer 2 has been equipped with a GUI (Graphic user interface) and that instructions from the user to the computer 2 are performed via the GUI.

Either of the storage parts of the computer 2 of the present embodiment (i.e., the storage unit 203 or memory 202) has stored therein image data obtained by the electronic camera 1.

It should be noted that the image data may not be image data obtained by the imaging sensor 104 in the electronic camera 1 but may be image data obtained by another imaging sensor having the same characteristics as the imaging sensor 104.

It should also be noted, however, that the image data are data that have not been subjected to the color transformation processing yet, or data that have been subjected only to a standard color transformation processing which is previously set in the electronic camera 1 at the time of fabrication of the electronic camera 1.

Figure 2:
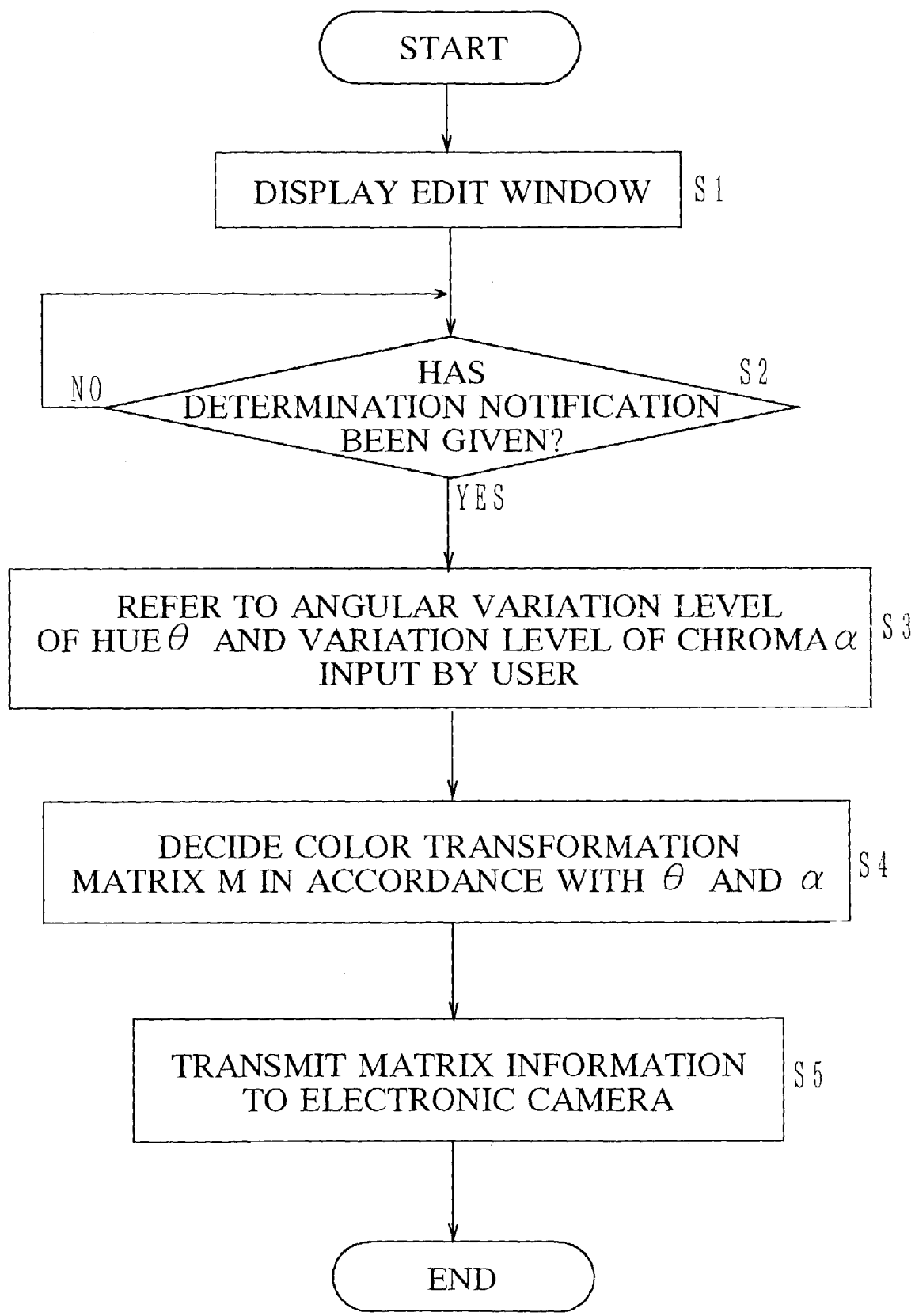
FIG. 2 is a diagram for explaining a parameter-determining program installed in a computer 2 of the first embodiment.
Figure 3:
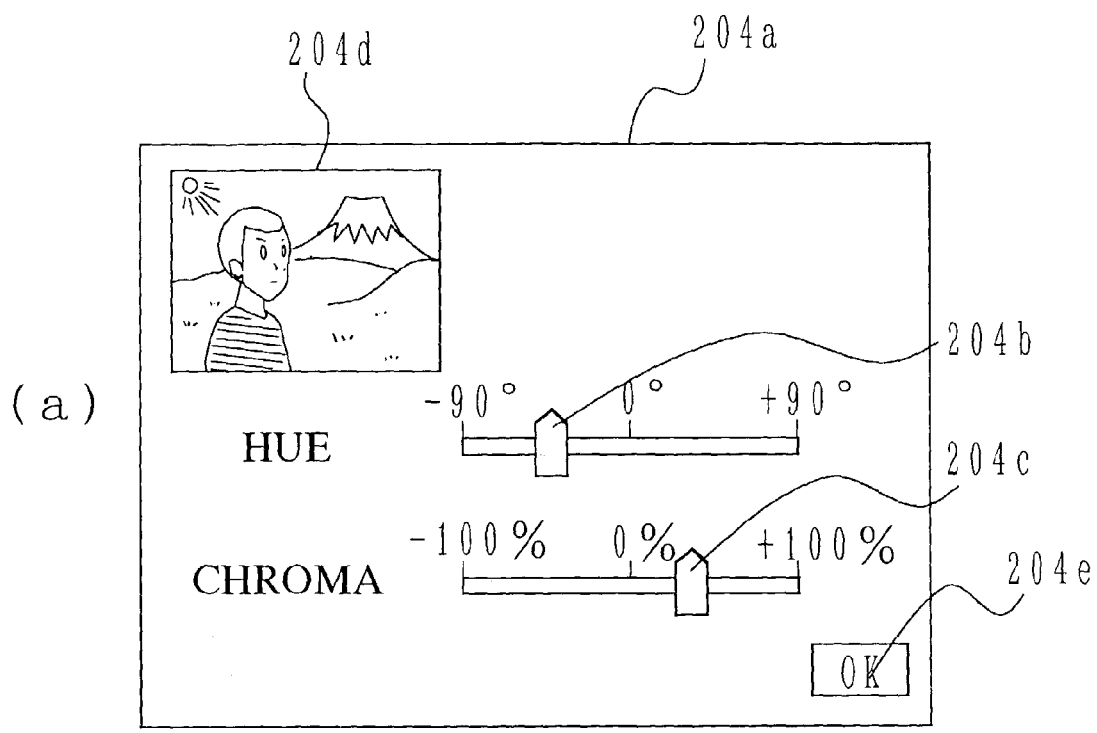
FIGS. 3(a) and 3(b) each are a diagram showing an edit window 204a of the first embodiment.
Figure 3:
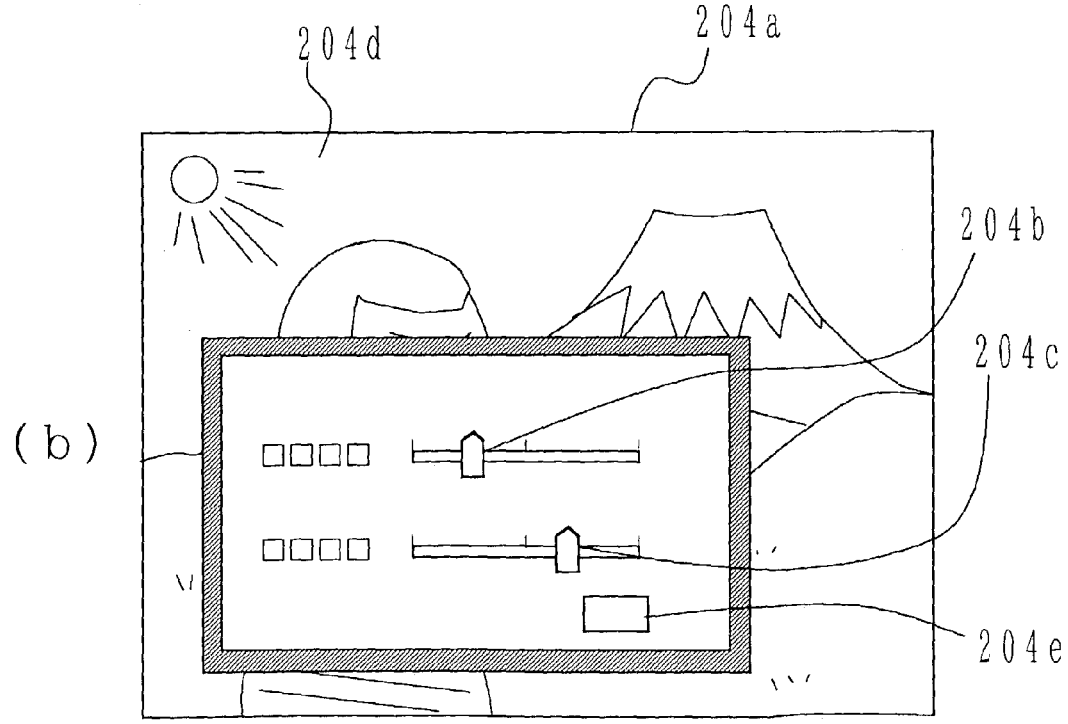

FIG. 2 is a diagram for explaining the parameter-determining program installed in the computer 2 of the present embodiment.

When the parameter-determining program is initiated, the display unit 204 displays, for example, an edit window 204a as shown in FIG. 3(a) (Step S1).

An image 204d of a subject (which is displayed based on the above image data) is placed in the edit window 204a.

An image 204b (hereinafter referred to as "slide bar 204b") for allowing the user to input his/her desired angular variation level of hue is also placed in the edit window 204a.

An image 204c (hereinafter referred to as "slide bar 204c") for allowing the user to input his/her desired variation level of chroma is also placed in the edit window 204a.

For example, the slide bar 204b allows the user to set the angular variation level of hue to a desired value within a range from minus 90 degrees to plus 90 degrees.

Also, for example, the slide bar 204c allows the user to set the variation level of chroma to a desired value within a range from minus 100 percents to plus 100 percents.

The subject image 204d and the slide bars 204b and 204c may be placed in the edit window 204a not in a layout as shown in FIG. 3(a) but in another layout, for example, as shown in FIG. 3(b).

An image 204e (hereinafter referred to as "determination button 204e") for allowing the user to notify the computer 2 that he has finished the edit operation is also placed in the edit window 204a.

If the user operates the slide bars 204b and 204c in the edit window 204a, the subject image 204d being displayed is subjected to the color transformation processing in accordance with such operations.

While viewing the edit window 204a, the user can operate the slide bars 204b and 204c so that he may select the determination button 204e when the subject image 204d comes to exhibit his/her desired colors, thereby giving the computer 2 a determination notification (which notifies that the variation levels have been determined) (Step S2, YES).

The computer 2 refers to the angular variation level of hue $\theta$ and the variation level of chroma $\alpha$ from the states of the slide bars 204b and 204c at the time when the computer 2 receives the determination notification (Step S3).

The computer 2 decides the color transformation matrix M, that is, the nine parameters (m11, m12, m13, m21, m22, m23, m31, m32, and m33) in accordance with the referred angular variation level of hue $\theta$ and variation level of chroma $\alpha$ (Step S4).

When the color transformation matrix M is decided, the matrix information indicative of the decided color transformation matrix M is transmitted to the electronic camera 1 via the interface circuit 206 (Step S5).

Figure 4:
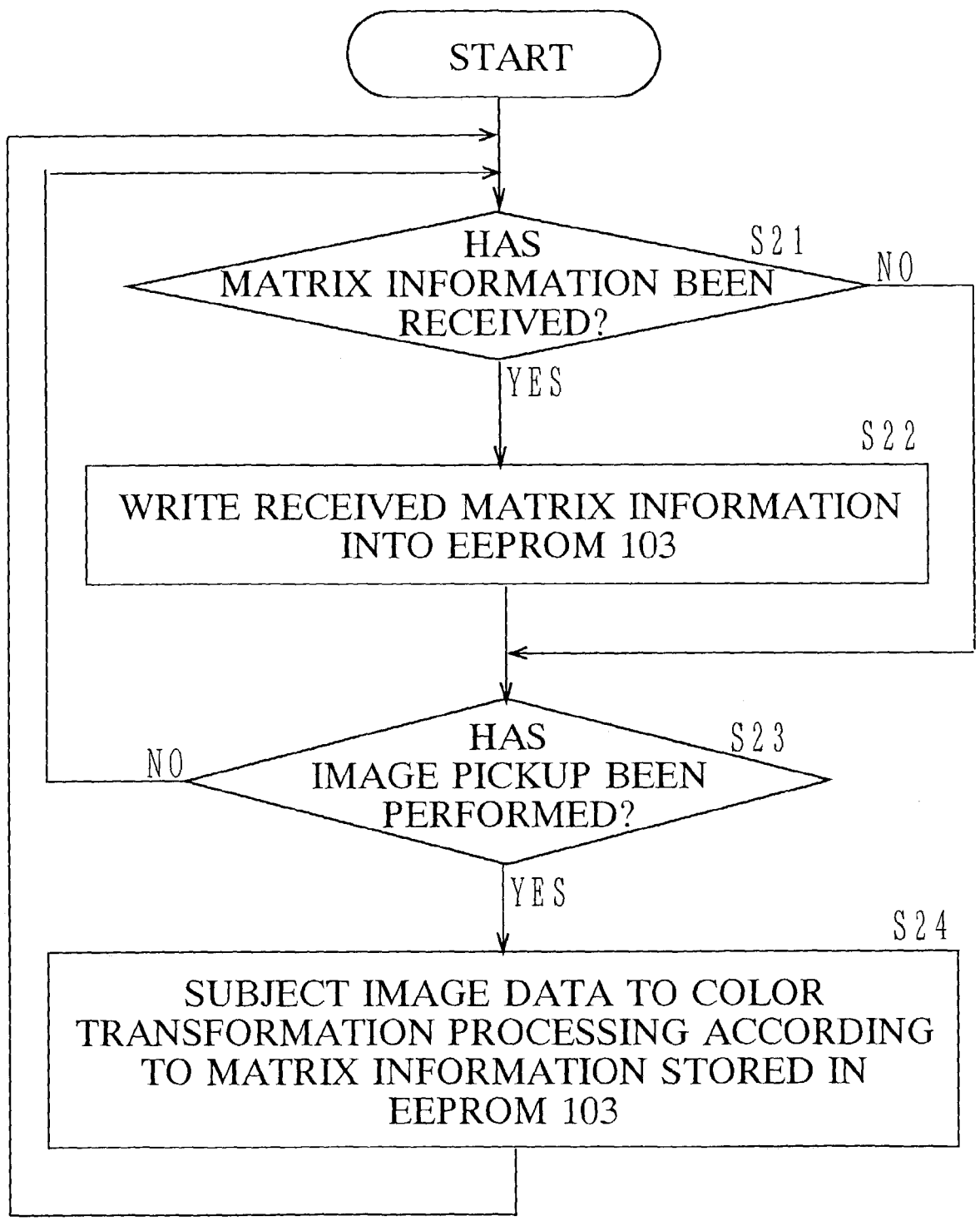
FIG. 4 is a diagram explaining the operation of a CPU 101 in an electronic camera 1 of the first embodiment.

FIG. 4 is a diagram explaining the operation of the CPU 101 in the electronic camera 1 according to the present embodiment. It should be noted that FIG. 4 shows only the steps concerning the present invention.

The matrix information, when received by the electronic camera 1 via the interface circuit 108 (Step S21, YES), is written into the EEPROM 103 (Step S22).

Then, when an image pickup is performed under an instruction given by the user (Step S23, YES), the color transformation matrix M indicated by the matrix information is set to the color transformation circuit 107b.

Therefore, the image data input to the color transformation circuit 107b are subjected to the color transformation processing according to the color transformation matrix M (Step S24).

This color transformation matrix M has been obtained by the user's edit performed on the computer 2. Therefore, the image as subjected to the color transformation processing exhibits the colors desired by the user.

Unless new matrix information is received and rewritten into the EEPROM 103 (Step S21, NO), the image data obtained by each image pickup will be subjected to the same color transformation processing (Step S23, YES and Step S24).

According to the image processing system of the present embodiment described above, the details of the user's edit performed on the computer 2 are reflected in the parameters (in the present embodiment, respective elements of the color transformation matrix M) in the electronic camera 1. Therefore, the user can obtain images exhibiting his/her desired colors only by performing image pickups by the electronic camera 1.

<Second Embodiment>

A second embodiment of the present invention will be described with reference to FIGS. 5 and 6. Only parts of the second embodiment that are different from the first embodiment will be described below.

An image processing system of the present embodiment, as well as the first embodiment, uses an electronic camera and a computer.

Figure 5:
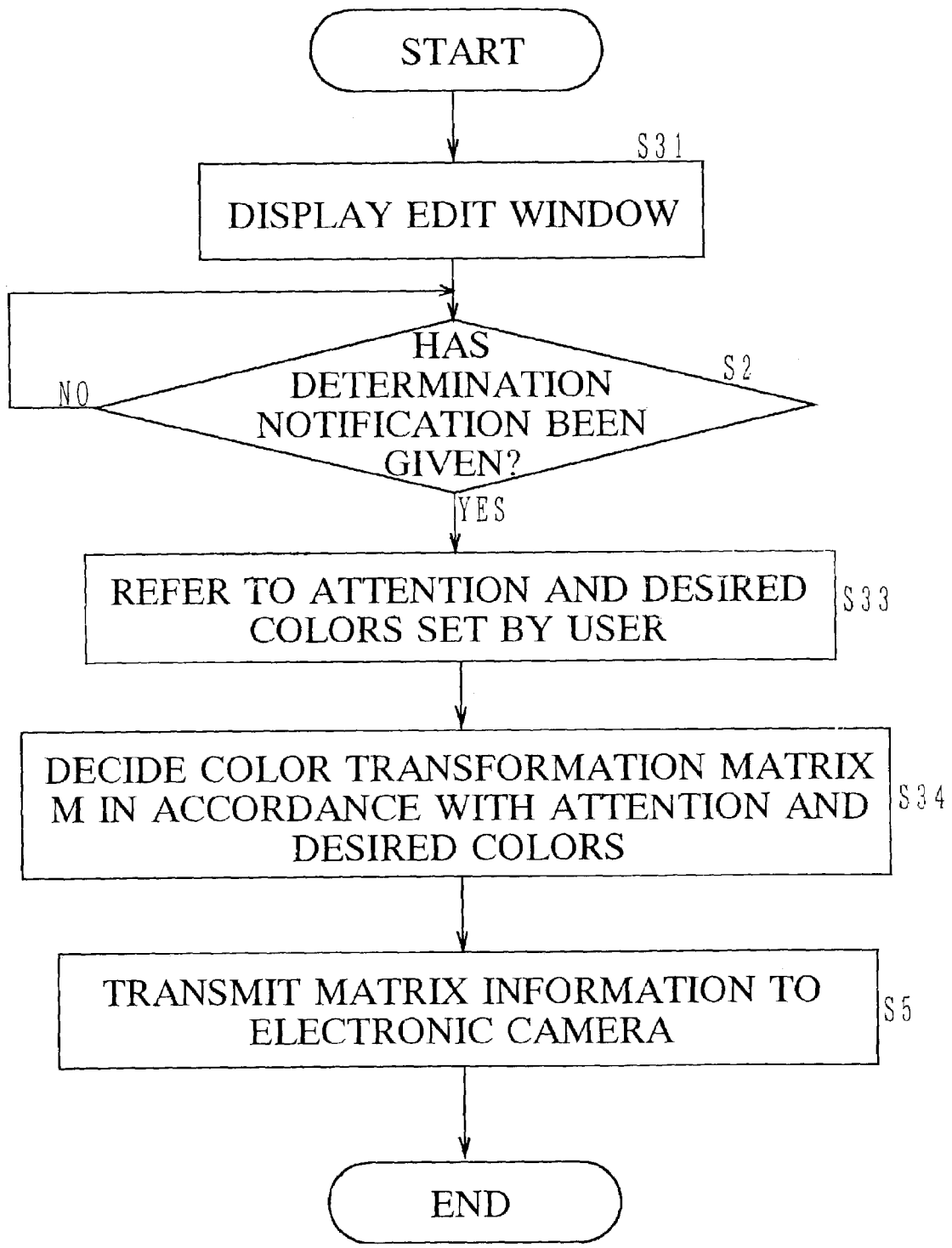
FIG. 5 is a diagram explaining a parameter-determining program installed in a computer of a second embodiment of the present invention.
Figure 6:
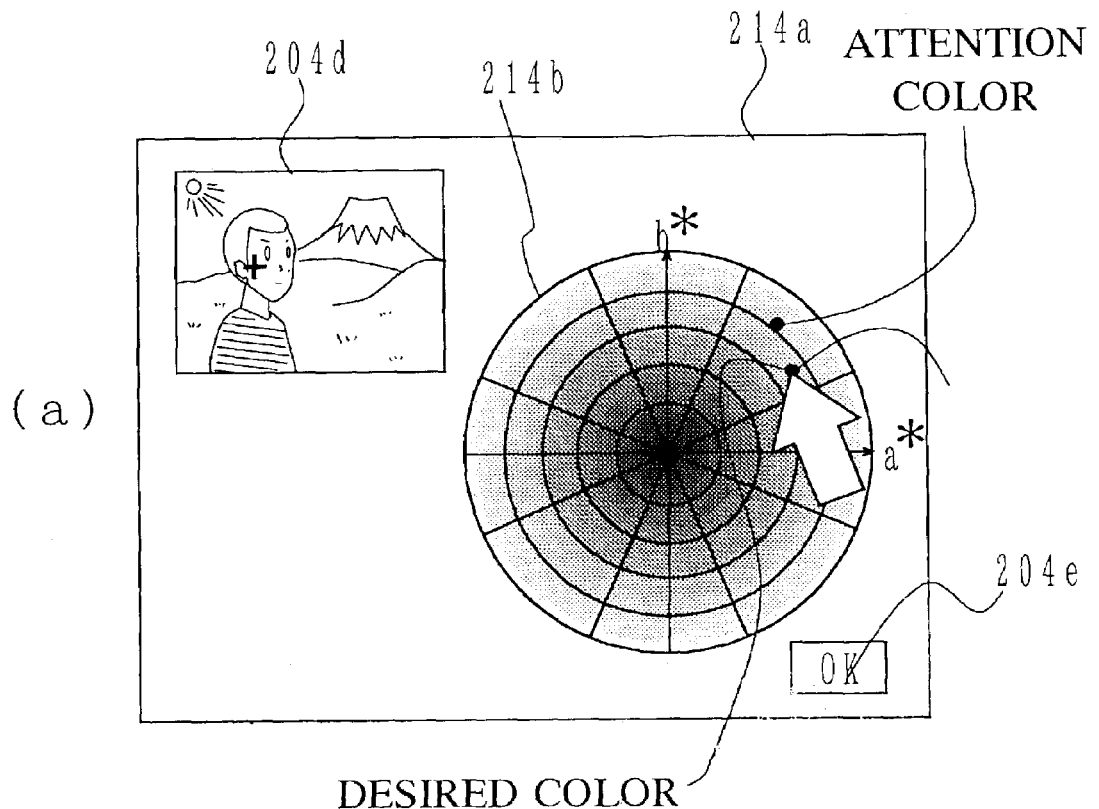
FIGS. 6(a) and 6(b) each are a diagram showing an edit window 214a displayed by the computer of the second embodiment.
Figure 6:
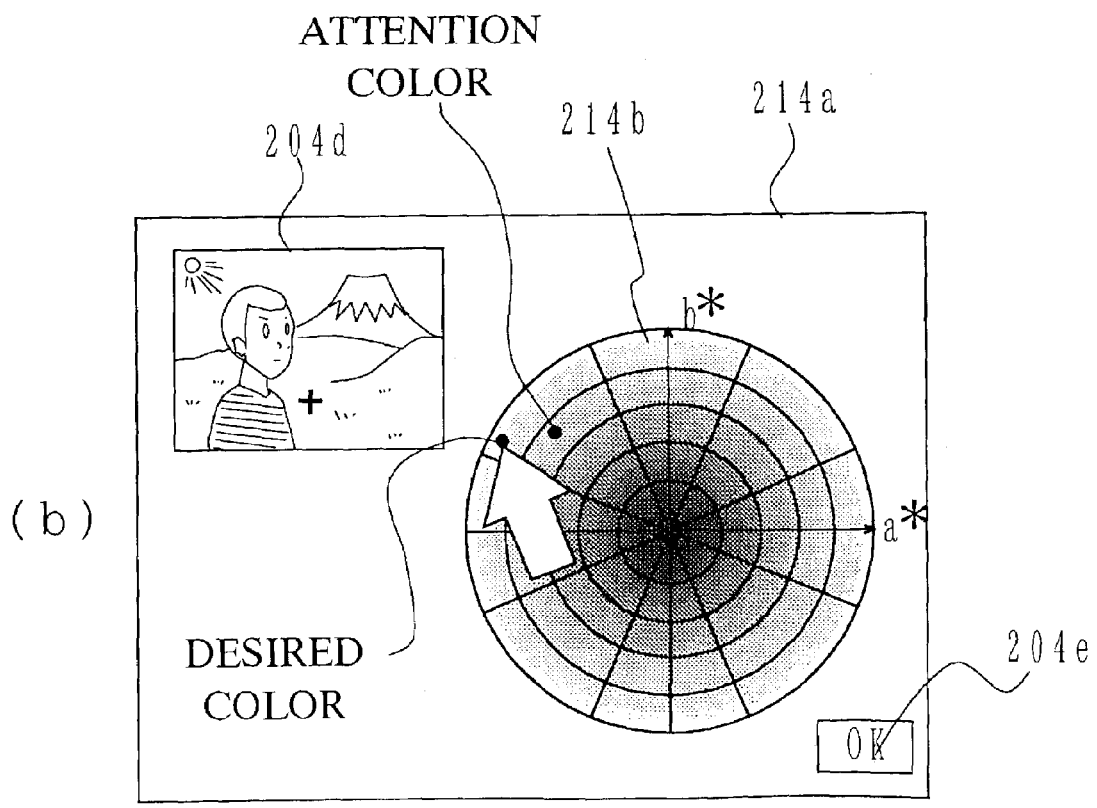

FIG. 5 is a diagram explaining a parameter-determining program installed in the computer of the present embodiment.

FIGS. 6(a) and 6(b) each are a diagram showing an edit window 214a displayed by the computer of the present embodiment.

As apparent from FIGS. 3(a) and 3(b), in the first embodiment, at least one of the angular variation level of hue and the variation level of chroma is specified by the user, and the color transformation matrix M is decided in accordance with the specified variation levels.

In the present embodiment, however, the user specifies an attention color and his/her desired color with respect to the attention color.

For example, as shown in each of FIGS. 6(a) and 6(b), the edit window 214a displayed by the computer of the present embodiment after an initiation of the parameter-determining program (Step S31 of FIG. 5) shows an image 204d of a subject for allowing the user to specify an attention color, and also shows a diagram 214b (hereinafter referred to as "color diagram 214b") for allowing the user to specify his/her desired color with respect to the attention color.

It should be noted that the color diagram 214b shown in each of FIGS. 6(a) and 6(b) is an a*b* plane of La*b* space (which plane indicates the hue and chroma).

This edit window 214a also shows an image 204e (hereinafter referred to as "determination button 204e") for notifying the computer that the user has finished the edit operation.

According to the present embodiment, when the user specifies a certain part on the image 204d of the subject, the color of the specified part will be regarded as an attention color.

The computer causes some kind of mark (in each of FIGS. 6(a) and 6(b), a black spot) to appear on the color diagram 214b, at a position corresponding to the foregoing attention color.

For example, when the user thinks the color of the human skin is important and specifies a part of the human skin on the image 204d of the subject as shown in FIG. 6(a), the color of the specified part of the human skin is regarded as the attention color. Then, the mark is caused to appear on the color diagram 214b at a position indicating that color (in the a*b* plane of FIG. 6(a), an upper right position).

For example, when the user thinks the color of the grass is important and specifies a part of the grass on the image 204d of the subject as shown in FIG. 6(b), the color of the specified part of the grass is regarded as the attention color. Then, the mark is caused to appear on the color diagram 214b at a position indicating that color (in the a*b* plane of FIG. 6(b), an upper left position).

Thereafter, when the user specifies another certain position on the color diagram 214b (for example, in either of FIGS. 6(a) and 6(b), a position indicated by an arrow), the color corresponding to that position is regarded as the desired color.

It should be noted that the color diagram 214b is preferably displayed in color so that the user can intuitively grasp the hue and chroma of the attention and desired colors.

It should be also noted that when the user specifies a desired color on the edit window 214a, it is preferred that the attention color in the displayed image 204d of the subject is also to be transformed to the desired color, accordingly.

The user can give a determination notification to the computer (Step S2 of FIG. 5, YES) by specifying his/her desired color on the color diagram 214b and then selecting the determination button 204e while viewing the edit window 214a.

The computer refers to the user's attention and desired colors (Step S33 of FIG. 5) at the time when the determination button 204e is selected (Step S2 of FIG. 5, YES).

Then, the computer decides the color transformation matrix M (the parameters m11, m12, m13, m21, m22, m23, m31, m32, and m33) (Step S34 of FIG. 5) for transforming the attention color to the desired color, and transmits the decided matrix information to the electronic camera similarly to the first embodiment (Step S5 of FIG. 5).

The electronic camera of the present embodiment, similarly to that of the first embodiment, performs the color transformation processing based on the matrix information.

Thus, according to the image processing system of the present embodiment, also, the details of the edit performed on the computer by the user are reflected in the parameters in the electronic camera. Therefore, the user can obtain images exhibiting his/her desired colors only by performing image pickups by the electronic camera.

It should be noted that in the present embodiment, the details of the user's edit are reflected in the color transformation matrix M used in the color transformation circuit 107b (See FIG. 1), but they may be reflected in a look-up table used in the gray-scale transformation circuit 107c (See FIG. 1).

In such a case, the information transmitted from the computer to the electronic camera (the EEPROM 103 in the electronic camera) will be information indicative of the contents of the look-up table to be used in the gray-scale transformation circuit 107c (profile information).

Also in such a case, in order to perform the gray-scale transformation processing, the CPU 101 refers to the profile information and sets, in the gray-scale transformation circuit 107c, the look-up table indicated by the profile information.

The gray-scale transformation circuit 107c subjects the respective signals inputted thereto to the gray-scale transformation according to the look-up table set therein.

Further, it should be noted that the parameters (i.e., respective elements of the color transformation matrix M or the contents of the look-up table) decided in the present embodiment are preferably parameters for transforming not only the attention color but also the colors around the attention color (the transformation is performed in the same way that the attention color is transformed).

<Third Embodiment>

Figure 8:
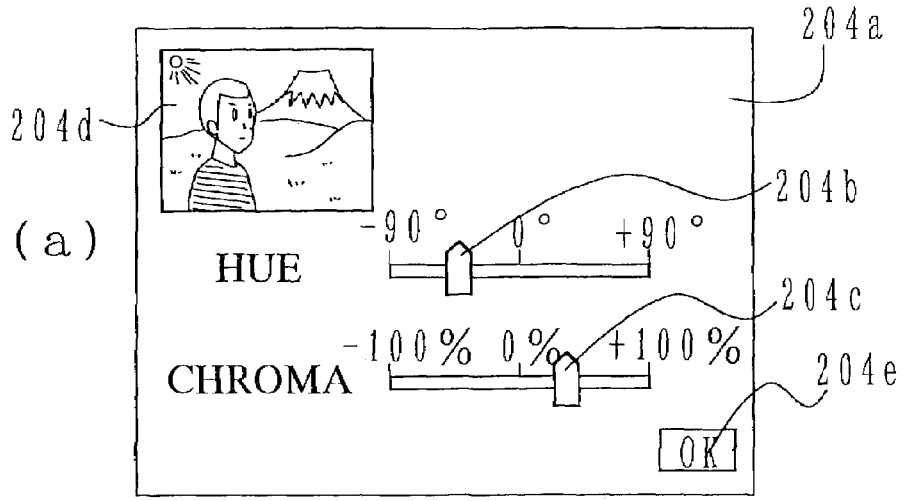
FIGS. 8(a), 8(b), and 8(c) each are a diagram showing an edit window 204a displayed by a computer of the third embodiment.
Figure 8:
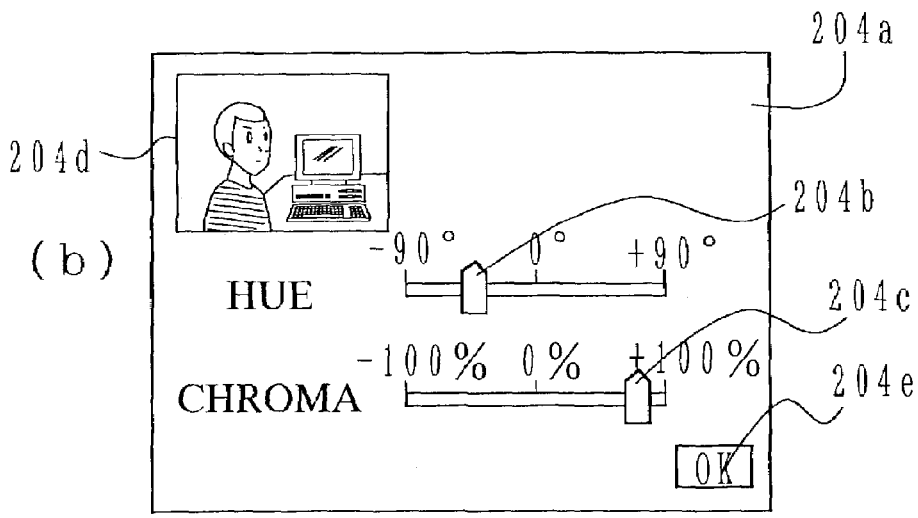
Figure 8:
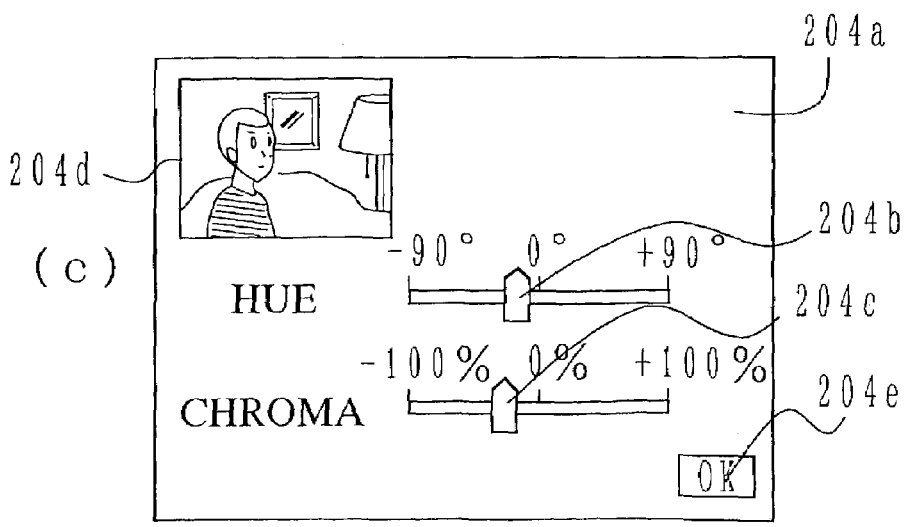

A third embodiment of the present invention will be described with reference to FIGS. 7 and 8. Only parts of the third embodiment that are different from the first embodiment will be described below.

The first embodiment is based on the premise that the user has only a single purpose with respect to the color of the image (for example, "causing the color of human skin to exhibit red").

However, there exist mutual differences among the parameters of the color transformation processing for reddening the human skin imaged under the sunlight, the parameters of the color transformation processing for reddening the human skin imaged under a fluorescent light, and the parameters of the color transformation processing for reddening the human skin imaged under an incandescent light.

Then, the imaging processing system of the present embodiment is constructed so as to flexibly accommodate such differences among light sources used at the time of image pickups (hereinafter referred to as "used-light-sources").

FIG. 7 is a diagram explaining the matrix information to be written into the EEPROM in the electronic camera according to the present embodiment.

According to the present embodiment, the matrix information transmitted from the computer to the electronic camera indicates not a single color transformation matrix M but a plurality of types of color transformation matrixes M1, M2, M3 and so on, respectively.

In the electronic camera, one of these color transformation matrixes M1, M2, M3 and so on is selectively used.

FIGS. 8(a), 8(b), and 8(c) are diagrams each explaining the edit window 204a displayed by the computer of the present embodiment.

According to the present embodiment, the user's edits are performed in the computer for the respective images obtained under different used-light-sources (for example, as shown in FIGS. 8(a), 8(b), and 8(c)).

For example, the images 204d of each subject shown in FIGS. 8(a), 8(b), and 8(c) are ones obtained under different used-light-sources, that is, the sunlight, fluorescent light, and incandescent light, respectively (hereinafter assume that the user's edits have been performed with respect to these three types of images).

As described above, even when the user edits the human skins of the images so as to exhibit the same color, the respective details of the edit performed for the respective images obtained under the different used-light-sources are different from one another.

The computer produces the respective color transformation matrixes M1, M2, and M3 based on each of the edit details.

Then, the computer produces and transmits matrix information indicative of these color transformation matrixes M1, M2, and M3 to the electronic camera. It should be noted that the matrix information may be divided and transmitted a plurality of times.

In order to realize that the color transformation matrixes M1, M2, and M3 are selectively used in the electronic camera, they must be sharply distinguishable from one another.

Therefore, the computer of the present embodiment allots identification information (herein, information indicative of types of the used-light-sources) to the respective color transformation matrixes M1, M2, and M3.

It should be noted that the computer can automatically distinguish the types of used-light-sources of the respective images from one another, based on the image data. Instead, the user may distinguish the types of used-light-sources of the respective images from one another and input the distinguished type to the computer.

Then, each time an image pickup is performed, the electronic camera distinguishes the type of the used-light-source of the obtained image. When the type of the used-light-source is distinguished as the incandescent light, the electronic camera selects and sets the color transformation matrix of the incandescent light (M3 of FIG. 7) in the color transformation circuit.

Instead, when the type of the used-light-source is distinguished as the fluorescent light, the electronic camera selects and sets the color transformation matrix of the fluorescent light (M1 of FIG. 7) in the color transformation circuit.

Instead, when the type of the used-light-source is distinguished as the sunlight, the electronic camera selects and sets the color transformation matrix of the sunlight (M2 of FIG. 7) in the color transformation circuit.

As described above, since the image processing system according to the present embodiment causes a plurality of types of parameters (herein, a plurality of types of color transformation matrixes) to be stored in the electronic camera and selectively used, they can be applied flexibly in accordance with the user's taste.

In the present embodiment, the plurality of types of parameters is prepared for the respective types of used-light-sources. However, for example, such plurality of types of parameters may be prepared for the respective colors of main subject within images or for the respective brightness of images.

Also in the present embodiment, at least one of the plurality of types of parameters that is selected is used as it is for the color transformation processings. However, the electronic camera may be constructed so that the selected at least one of the plurality of types of parameters is corrected (in accordance with the brightness or the like of images) and then used for the color transformation processings.

In cases where the electronic camera is equipped with a function for automatically creating the parameters, the electronic camera may be constructed so that the parameters to be actually used are created based on both the automatically created parameters and parameters, which are the closest to the automatically created parameters, among the foregoing plurality of types of parameters.

In the present embodiment, it is the electronic camera itself which selects one of the plurality of types of parameters. However, the electronic camera may be constructed so that the user himself/herself can optionally select one of the plurality of types of parameters.

In such a case, some optional types of parameters are prepared in advance, so that the user can selectively use one of them in accordance with his/her feeling or the like at the time of an image pickup.

Additionally, the electronic camera may be constructed so that the image data obtained by a single image pickup are subjected to some color transformation processings using respective types of parameters, whereby images exhibiting various hues can be obtained at a time.

Moreover, the electronic camera may be constructed so that when it is shared in use among a plurality of users, the types of parameters can be prepared for the respective users.

In each of the embodiments of the present invention, the electronic camera and computer are directly communicated with each other for transmitting the information, however, the information may be transmitted via a recording medium, a communication network, a human hand or the like.

Also, in each of the foregoing embodiments of the present invention, part or all of the functions of the computer may be included in the electronic camera.

Also, in each of the embodiments of the present invention, the image of a subject displayed in the edit window on the computer may not be an image obtained by imaging an actual subject but may be an image obtained by imaging a "chart" composed of color samples of chroma and hue.

The invention is not limited to the above embodiments and various modifications may be made without departing from the spirit and scope of the invention. Any improvement may be made in part or all of the components.

What is claimed is:

1. An image processing system comprising:
   an imaging device for imaging a subject to obtain image data; and
   an information-processing device for determining at least one parameter to be used for a color transformation processing in the imaging device, wherein the information-processing device includes
   an input unit for inputting, from the exterior, information indicative of a color transformation processing desired by a user,
   a parameter-creating unit that refers to the input information to create at least one parameter necessary for providing the color transformation processing to the image data, and
   a transmitting unit for transmitting the information of the created parameter to the exterior, and wherein imaging device includes
   a receiving unit for receiving the information of the parameter from the exterior,
   a storage unit for storing the received information of the parameter, and
   a setting unit that refers to the information stored in the storage unit to perform a setting necessary for the color transformation processing using the parameter,
   wherein the input unit of the information-processing device inputs the information indicative of the desired color transformation processing, by showing the user an image obtained by an imaging sensor having the same characteristics as an imaging sensor in the imaging device, and by allowing the user to edit the obtained image.

2. The image processing system according to claim 1, wherein:
   the color transformation processing is performed using a color transformation matrix; and
   the parameter is each element of the color transformation matrix.

3. The image processing system according to claim 1, wherein
   the input unit of the information-processing device inputs, as the information indicative of the color transformation processing, at least one of: an attention color attended by the user and a desired color desired by the user with respect to the attention color; an angular variation level of hue desired by the user; and a variation level of chroma desired by the user.

4. The image processing system according to claim 1, wherein
   the setting unit of the imaging device performs the setting in accordance with the information of the parameter stored in the storage unit and the type of a subject to be imaged.

5. The image processing system according to claim 4, wherein
   the storage unit of the imaging device can store a plurality of types of information on the parameter.

6. The image processing system according to claim 5, wherein
   the setting unit of the imaging device selectively uses one of the plurality of types of information on the parameter stored in the storage unit.

7. The image processing system according to claim 4, wherein
   the type of subject is decided based on at least one of a light source that illuminates the subject, a color in a main subject within the subject, and a degree of brightness of the subject.

8. The image processing system according to claim 7, wherein
   the storage unit of the imaging device is configured to store a plurality of types of information on the parameter that corresponds to a plurality of types of subjects; and
   the setting unit of the imaging device selectively uses one of the plurality of types of information on the parameter stored in the storage unit.

9. The image processing system according to claim 4, wherein the storage unit of the imaging device is configured to store a plurality of types of information on the parameter that corresponds to a plurality of types of subjects; and
   the setting unit of the imaging device selectively uses one of the plurality of types of information on the parameter stored in the storage unit.

10. A computer readable medium storing a program for determining at least one parameter to be used for a color transformation processing in an imaging device that images a subject to obtain image data, the program performing:
    inputting, from the exterior, information indicative of a color transformation processing desired by a user;
    creating a parameter by referring to the input information to create at least one parameter necessary for providing the color transformation processing to the image data; and
    transmitting the information of the created parameter to the exterior, wherein inputting the information indicative of the desired color transformation processing comprises showing the user an image obtained by an imaging sensor having the same characteristics as an imaging sensor in the imaging device, and by allowing the user to edit the obtained image.

11. The computer-readable medium according to claim 10, wherein:

the color transformation processing is performed using a color transformation matrix; and the parameter is each element of the color transformation matrix.

12. The computer-readable medium according to claim 10, wherein in the inputting, at least one of: an attention color attended by the user and a desired color desired by the user with respect to the attention color; an angular variation level of hue desired by the user; and a variation level of chroma desired by the user is input as the information indicative of the color transformation processing.

13. The computer-readable medium according to claim 10, wherein the imaging device performs a setting necessary in the color transformation processing using parameters in accordance with the information of the parameter transmitted in the transmission step and the type of subject to be imaged by the imaging device.

14. The computer-readable medium according to claim 13, wherein the type of subject is decided based on at least one of a light source that illuminates the subject, a color in a main subject within the subject, and a degree of brightness of the subject.

* * * * *